(12) United States Patent
Fukuma et al.

(10) Patent No.: US 10,578,149 B2
(45) Date of Patent: Mar. 3, 2020

(54) CONNECTING ROD OF ENGINE

(71) Applicant: MAZDA MOTOR CORPORATION, Hiroshima (JP)

(72) Inventors: Masaki Fukuma, Hiroshima (JP); Satoshi Imamura, Hiroshima (JP); Hiroyuki Hamamoto, Kure (JP); Masayuki Kidokoro, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 27 days.

(21) Appl. No.: 15/673,061

(22) Filed: Aug. 9, 2017

(65) Prior Publication Data
US 2018/0058497 A1    Mar. 1, 2018

(30) Foreign Application Priority Data

Aug. 31, 2016  (JP) .................. 2016-169055

(51) Int. Cl.
| | | |
|---|---|---|
| *F16C 9/04* | (2006.01) | |
| *F16C 7/02* | (2006.01) | |
| *F16C 11/02* | (2006.01) | |

(52) U.S. Cl.
CPC .............. *F16C 7/023* (2013.01); *F16C 11/02* (2013.01); *F16C 2204/00* (2013.01); *F16C 2226/12* (2013.01)

(58) Field of Classification Search
CPC .... F02B 75/32; F16C 7/06; F16C 9/04; F16C 7/02; F16C 7/023; F16C 2226/00; F16C 2226/62; F16C 2226/80; F16C 2240/40; F16J 7/00; F16F 13/10; F16F 13/22; F16F 13/26; F16F 2228/066

USPC ........................................... 123/197.3, 197.4
See application file for complete search history.

(56) References Cited

U.S. PATENT DOCUMENTS

| | | | | |
|---|---|---|---|---|
| 1,481,727 A * | 1/1924 | Moore | .................. | F02B 75/222 123/197.4 |
| 1,581,255 A * | 4/1926 | Watts | .................. | F16J 7/00 92/141 |
| 2,232,170 A * | 2/1941 | Eynon | ...................... | F16C 9/04 184/6.5 |
| 2,281,349 A * | 4/1942 | Brewin | ................... | F16C 7/023 74/579 E |
| 3,698,264 A * | 10/1972 | York | ........................ | F16C 7/02 267/70 |
| 3,822,609 A * | 7/1974 | Kotoc | ..................... | F16C 7/023 74/579 E |
| 4,266,443 A * | 5/1981 | McWhorter | ............ | F02B 41/04 74/579 E |
| 4,350,056 A | 9/1982 | Ban et al. | | |
| 4,546,669 A * | 10/1985 | Fischer | ................... | F16C 7/026 123/197.3 |

(Continued)

FOREIGN PATENT DOCUMENTS

| | | |
|---|---|---|
| GB | 178172 A | 4/1922 |
| JP | 2015-161322 A | 9/2015 |
| WO | WO-2018138748 A2 * | 8/2018 ............. F02B 75/32 |

*Primary Examiner* — George C Jin
*Assistant Examiner* — Teuta B Holbrook
(74) *Attorney, Agent, or Firm* — Studebaker & Brackett PC

(57) ABSTRACT

A connecting rod includes a rod having the form of a bar, a smaller end part, and a larger end part. The rod is provided with a friction generation portion at which friction is generated due to deformation of the rod.

5 Claims, 13 Drawing Sheets

(56) References Cited

U.S. PATENT DOCUMENTS

| | | | | |
|---|---|---|---|---|
| 4,939,952 A | * | 7/1990 | Romer | F04B 39/0022 |
| | | | | 29/888.092 |
| 7,281,449 B2 | * | 10/2007 | Harimoto | F16C 7/023 |
| | | | | 74/579 E |
| 2015/0240711 A1 | | 8/2015 | Kanda et al. | |

* cited by examiner

CONNECTING ROD OF ENGINE

CROSS-REFERENCE TO RELATED APPLICATION

This application claims priority to Japanese Patent Application No. 2016-169055 filed on Aug. 31, 2016, the entire disclosure of which is incorporated by reference herein.

BACKGROUND

The present disclosure relates to a structure of a connecting rod of an engine, the connecting rod coupling a piston to a crankshaft.

When an engine is operating, its connecting rod is periodically subjected to various kinds of deformation such as expansion and contraction, bending, and twisting. It is known in the art that resonance caused by such deformations leads to noise and oscillations of the engine. To reduce oscillations, which occur at specific frequencies and cause such resonance, the known art proposes to install dynamic vibration absorbers, which oscillate in phases substantially opposite to those of the oscillations, at the connecting rod and its connecting portion.

Japanese Unexamined Patent Publication No. 2015-161322, for instance, discloses a connecting rod structure in which dynamic vibration absorbers are installed at two spots, namely the connecting rod and its connecting portion, to reduce oscillations of two specific frequencies. Specifically, in order to reduce resonance occurring at 3.3 kHz when the connecting rod expands and contracts, a first dynamic vibration absorber is installed inside a piston pin which is coupled to a smaller end part of the connecting rod. In addition, in order to reduce resonance which occurs at a frequency of 1 to 2 kHz and may be noticeable next after having reduced the resonance caused by the expansion and contraction of the connecting rod, a second dynamic vibration absorber is installed at a larger end part of the connecting rod which is coupled to a crankshaft.

In the connecting rod structure disclosed in Japanese Unexamined Patent Publication No. 2015-161322, dynamic vibration absorbers which handle specific frequencies are installed. Thus, while resonances occurring at the designated frequencies can be reduced with a high degree of precision, it is necessary to install a dynamic vibration absorber for each frequency. Therefore, further dynamic vibration absorbers, such as third and fourth dynamic vibration absorbers, need to be installed in order to reduce resonance occurring over a wide frequency band. As an inevitable result, the connecting rod and its connecting portion are designed in a more complex manner and the structure is increased in weight. Moreover, since the number of dynamic vibration absorbers which can be installed is limited, the frequency band at which resonance can be reduced is also limited.

In view of the foregoing, the present disclosure attempts to provide a connecting rod which allows for reducing resonance occurring over a wide frequency band while having a simple structure which hardly increases the weight of the connecting rod.

The art disclosed relates to a connecting rod coupled to a reciprocating piston and to a rotating crankshaft inside an engine.

The connecting rod includes: a rod having the form of a bar; a smaller end part provided at one end of the rod and coupled via a piston pin to the piston in a rotatable manner; and a larger end part provided at an other end of the rod and coupled via a crank pin to the crankshaft in a rotatable manner. The rod is provided with a friction generation portion at which friction is generated due to deformation of the rod.

That is, in this connecting rod, the rod is provided with a friction generation portion at which friction is generated due to deformation of the rod. When the rod deforms, frictional heat is thus generated at the friction generation portion due to the friction. As a result, energy acting on the rod declines, which is why oscillation of the rod can be reduced. As long as friction is generated, various kinds of deformation, such as expansion and contraction, bending, or twisting, can be handled and oscillation over a wide frequency band can be reduced. Since it is sufficient to just provide the friction generation portion, there is no need for a complicated structure and the weight of the connecting rod is hardly increased. In addition, in comparison to the case where—as disclosed in the known art—a dynamic vibration absorber is installed inside the piston pin, the structure in which the rod is provided with a damping element comprising the friction generation portion has the effect that reciprocating weight when the piston is reciprocating can be reduced.

Specifically, the connecting rod further includes a damping element at least attached to the rod, wherein the friction generation portion is provided by at least partly pressing the damping element and the rod together.

The friction generation portion may be provided by processing the connecting rod itself. Alternatively, however, the friction generation portion can be provided in an easier manner by attaching such a damping element to the connecting rod.

More specifically, the damping element is attached to the connecting rod by a first fixed portion and a second fixed portion which are spaced apart from each other. The first fixed portion and the second fixed portion have different mounting strengths. At least one of the first fixed portion and the second fixed portion is capable of friction.

Thanks to this configuration, friction of different friction force can be obtained over a wide area of the rod. Therefore, oscillation over a wider frequency band can be reduced.

In this case it is in particular beneficial if the first fixed portion which is capable of friction and has a low mounting strength is arranged near the smaller end part, and if the second fixed portion which has a high mounting strength is arranged near the larger end part.

According to this configuration, the friction generation portion can be provided near the smaller end part which has a relatively high deformation rate. Therefore, oscillation can be reduced even more effectively as high frictional heat is generated.

Further, the damping element may be a flat element extending in a curved manner along the rod, both end portions of the damping element being attached to the rod and an intermediate portion of the damping element being pressed onto the rod.

In this case, the intermediate portion of the damping element is pressed to the rod while being in surface-to-surface contact with the rod over a wide area. Therefore, a friction generation portion capable of friction can be provided at the intermediate portion of the rod.

Furthermore, the damping element may be a flat element extending in a curved manner along the rod, an intermediate portion of the damping element being attached to the rod and both end portions of the damping element being pressed onto the rod.

In this case, the end portions of the damping element are pressed onto the rod, and friction generation portions capable of friction can be provided at both end portions of the rod.

Moreover, the damping element may be press-fitted into a slot formed inside the rod.

In this case, the damping element is pressed onto an inner peripheral surface of the slot. Therefore, the rod can be provided with a friction generation portion capable of friction.

The connecting rod disclosed herein allows for reducing resonance occurring over a wide frequency band while having a simple structure which hardly affects the weight of the connecting rod.

DETAILED DESCRIPTION

Embodiments of the present disclosure will now be described in detail with reference to the drawings. Note that the description is merely a beneficial example in nature, and is not intended to limit the scope, application, or uses of the present disclosure. Unless stated otherwise, in the following description, terms referring to directions ("longitudinal", "lateral," "vertical") correspond to the directions indicated by the arrows shown in FIG. 1, in which the crankshaft extends in a longitudinal direction.

Oscillation Caused by Connecting Rod

Taking a conventional engine 100 as an example, it will be explained how oscillation caused by a connecting rod is generated.

Figure 1:
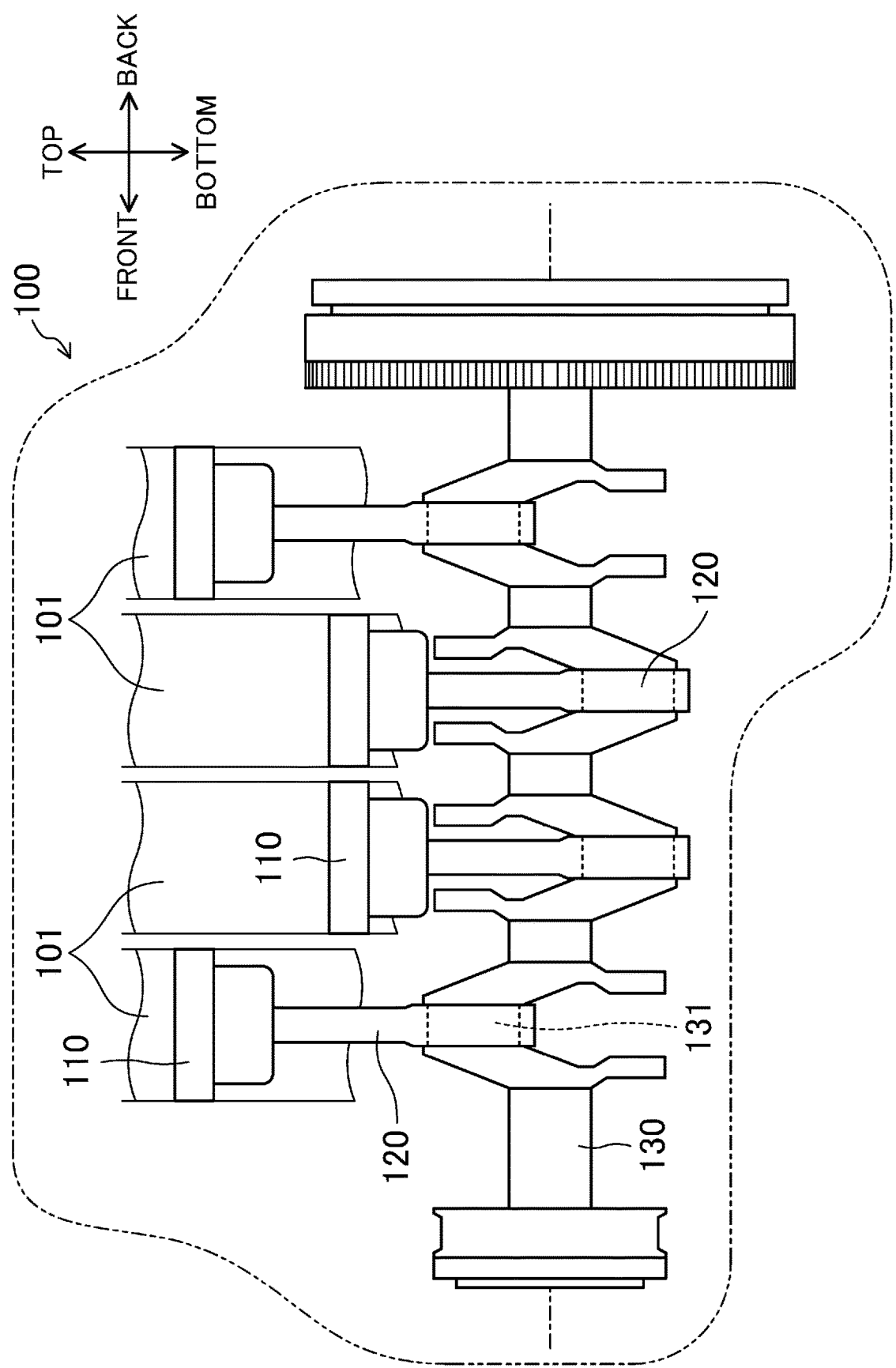
FIG. 1 is a schematic view providing an example of a conventional configuration and illustrating a peripheral portion of a connecting rod in a conventional engine.
Figure 2:
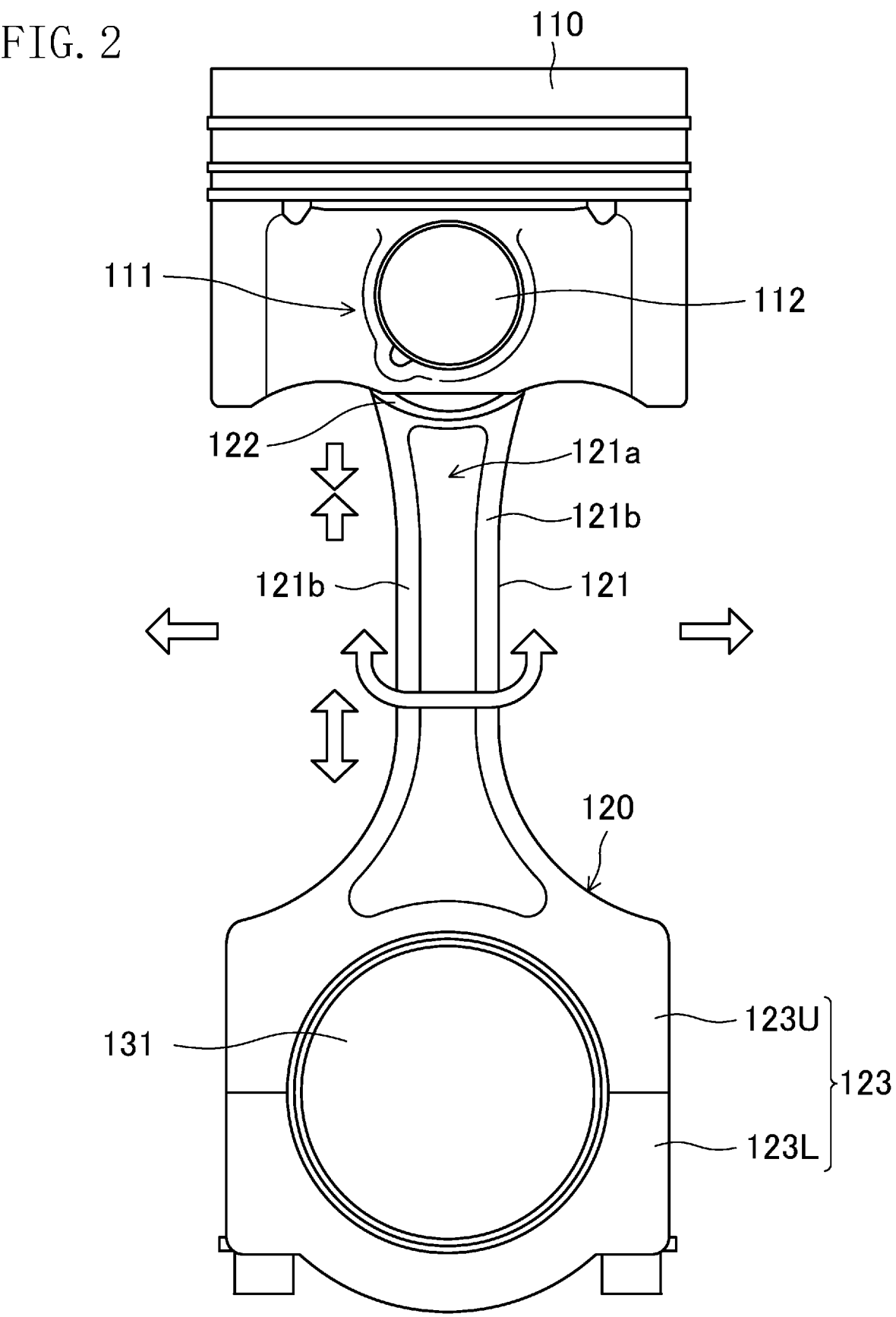
FIG. 2 is a partial enlarged view of a piston pin and the connecting rod shown in FIG. 1 which illustrates an example of a conventional configuration.
Figure 3:
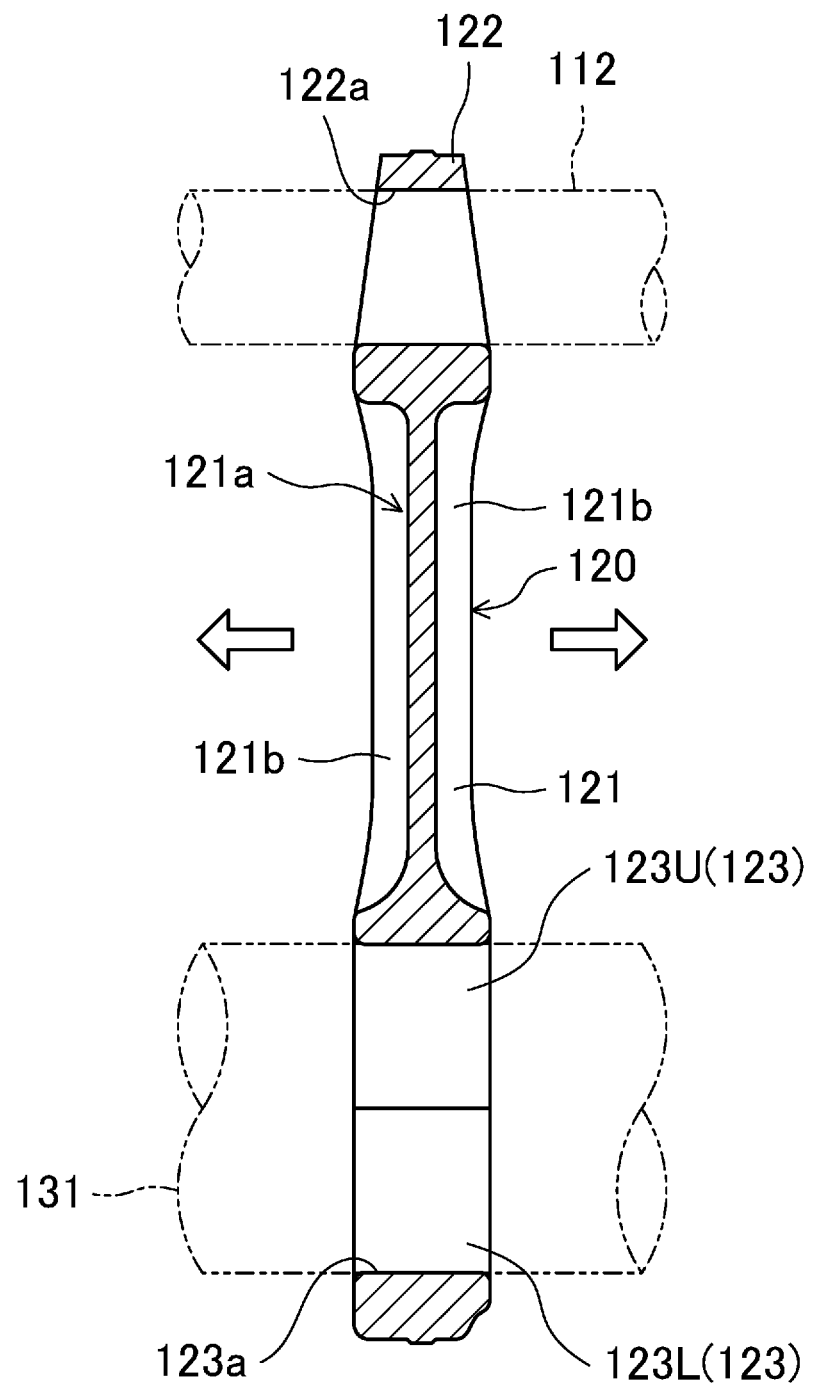
FIG. 3 is a cross-sectional view of the connecting rod of FIG. 2 which illustrates an example of a conventional configuration.

FIG. 1 illustrates a portion of a conventional engine 100 including pistons 110, a connecting rod 120, and a crankshaft 130. Further, FIG. 2 illustrates a portion of one of the pistons 110 and the connecting rod 120 in an enlarged scale, while FIG. 3 is a cross-sectional view of a portion of the connecting rod 120 shown in FIG. 2.

The engine 100 is a conventional engine mounted in an automobile, and has a plurality of cylinders arranged in series in a longitudinal direction in which the crankshaft 130 extends. Each of the cylinders is provided with a cylindrical cylinder 101 which has a combustion chamber in its top portion. One of the pistons 110 is slidably accommodated inside each of the cylinders 101. Each of the pistons 110 has a top surface defining a bottom surface of the associated combustion chamber.

The connecting rod 120 is a highly stiff metal element, e.g., forged of steel. The connecting rod 120 includes a rod 121 having the form of a bar, a smaller end part 122 provided at one end of the rod 121, and a larger end part 123 which is provided at an other end of the rod 121 and which is larger than the smaller end part 122. In order to save weight, recessed areas 121a extending along a center line are formed one each in a center of a front surface and in a center of a back surface of the rod 121. The rod 121 has a traversal cross-section which substantially has the shape of an "I" and includes elongated ribs 121b and 121b at both sides of each of the recessed areas 121a.

The smaller end part 122 and the larger end part 123 both have a cylindrical form with a center line extending in the longitudinal direction. A narrow pin hole 122a is formed in the smaller end part 122 and penetrates the smaller end part 122 longitudinally. A wide pin hole 123a which has a larger diameter than the narrow pin hole 122a is formed in the larger end part 123 and penetrates the larger end part 123 longitudinally. The larger end part 123 can be divided at its vertical center portion into two elements of a semicircular cross-section, namely an upper portion 123U and a lower portion 123L of the larger end part. The larger end part 123 is combined into an integral part by abutting the lower portion 123L against the upper portion 123U and securing the two elements with bolts.

A boss part 111 is provided at a bottom of the piston 110. Both end portions of a piston pin 112 which has the form of a column are supported by the boss part 111 in a rotatable manner. An intermediate portion of the piston pin 112 is inserted into the narrow pin hole 122a in a rotatable manner. As a result, the smaller end part 122 is coupled via the piston pin 112 to the piston 110 in a rotatable manner.

The crankshaft 130 includes a crank pin 131 arranged at a location remote from a rotation center of the crankshaft 130 in a radial direction. The crank pin 131 of the crankshaft 130 is inserted into the wide pin hole 123a in a rotatable manner. As a result, the larger end part 123 is coupled via the crank pin 131 to the crankshaft 130 in a rotatable manner.

Lubricating oil is supplied onto a portion between the boss part 111 and the piston pin 112, a portion between the smaller end part 122 and the piston pin 112, and a portion between the larger end part 123 and the crank pin 131 respectively to provide each of these portions with a lubricating oil film. These lubricating oil films ensure that the connecting rod 120 operates smoothly.

When the engine 100 is operating, a combustion cycle (intake stroke, compression stroke, combustion stroke, and exhaust stroke) is repeatedly performed in the combustion chamber of each of the cylinders, and each of the pistons 110 reciprocates inside an associated one of the cylinders 101. This reciprocating motion of the pistons 110 is transmitted via the connecting rods 120 to the crankshaft 130. As a result, the crankshaft 130 rotates, and its motive power is output to driving wheels of a vehicle.

During the combustion stroke, the piston 110 is pushed with great strength downward toward the crankshaft 130. Therefore, a large load acts on the connecting rod 120. By this, the rod 121 is deformed periodically in various modes as indicated by the arrows in FIGS. 2 and 3: the rod 121 expands and contracts vertically, is bended longitudinally and laterally, and is twisted around its center line. These periodical deformations are accompanied by oscillations shaking the rod 121 at various frequencies. As these oscillations resonate, problematic oscillations and noise are generated in the engine 100.

At present, as a countermeasure to reduce the oscillations which occur at specific frequencies and cause such resonance, dynamic vibration absorbers are installed at the connecting rod and its connecting portion. However, as described above, in the scope of this method it is necessary to install a plurality of dynamic vibration absorbers. Further, the frequency band at which resonance can be reduced is limited.

To solve this problem, the inventors of the present disclosure have conceived a vibration control method in the scope of which load acting on the connecting rod is diffused by frictional heat. Specifically, the rod is provided with portions (friction generation portions) which are displaced relative to each other while being in contact with each other and rub against each other thereby generating friction. As a result, deformation of the rod causes generation of friction at the friction generation portions. Therefore, the load acting on the connecting rod can be converted into frictional heat and diffused.

A verification test has been performed to verify this vibration control method. Results have verified that oscillations of a wide range of frequencies generated due to various deformations in the rod can be reduced with the help of this vibration control method. Concrete examples are described below.

First Embodiment

Figure 4:
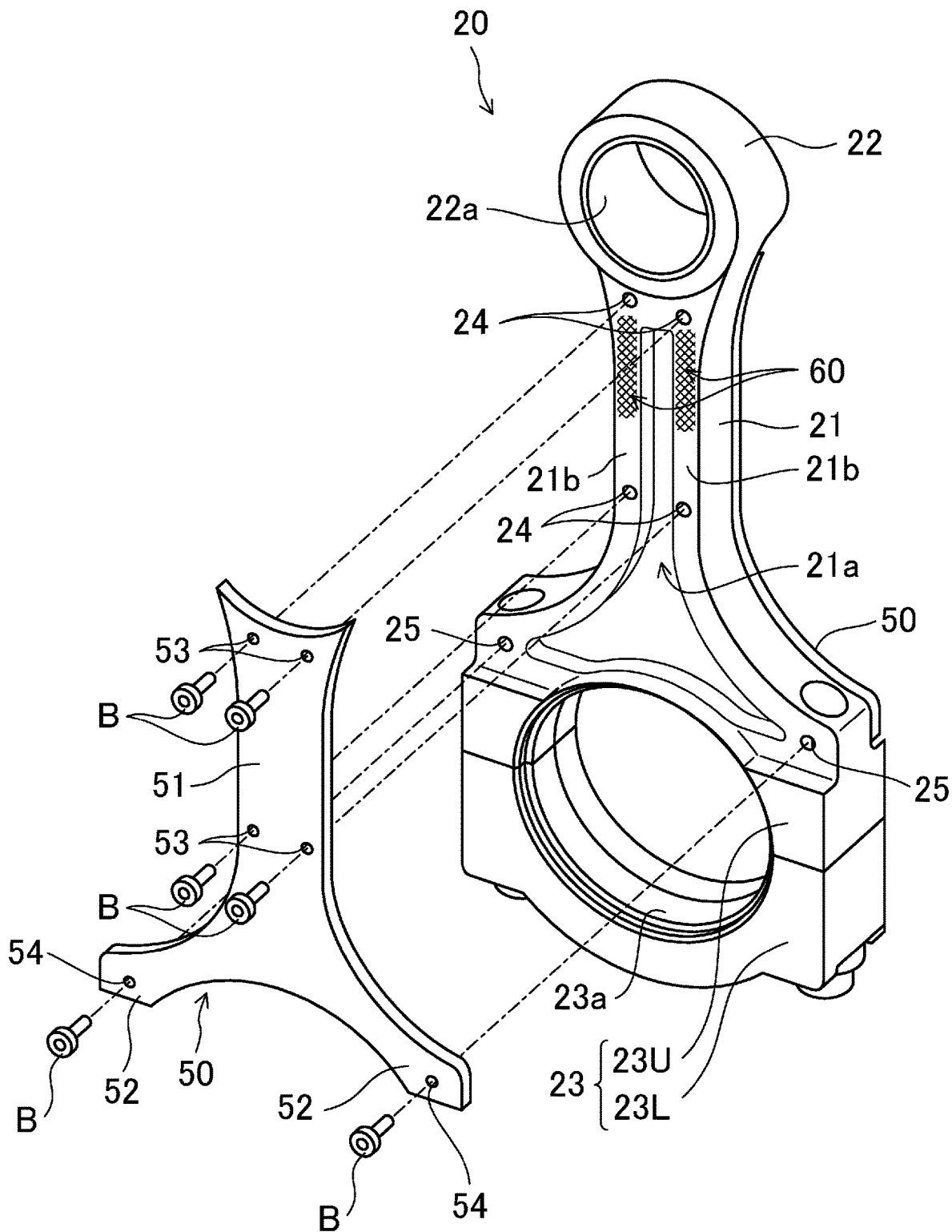
FIG. 4 is a perspective view schematically illustrating a connecting rod according to a first embodiment of the present disclosure.
Figure 5:
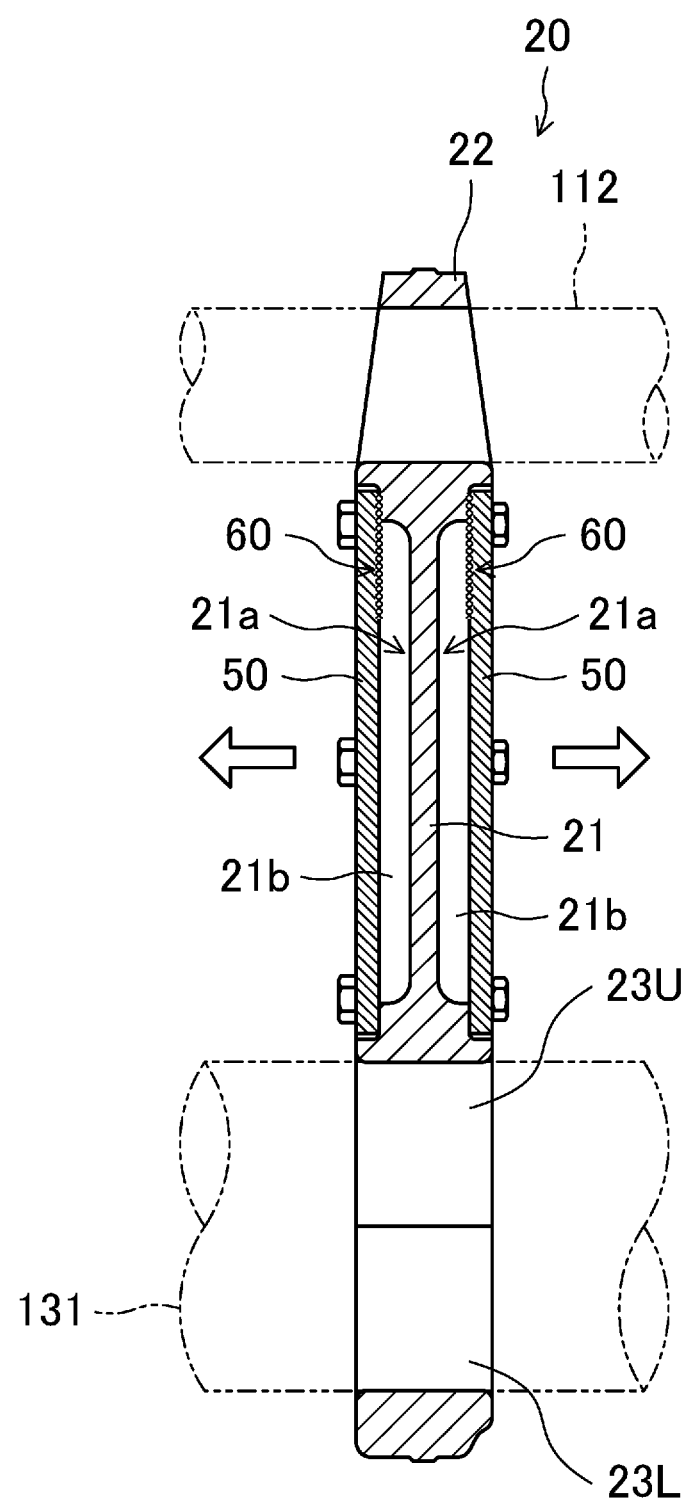
FIG. 5 is a cross-sectional view of the connecting rod shown in FIG. 4.

FIGS. 4 and 5 show a connecting rod 20 of the present embodiment. The connecting rod 20 and the connecting rod 120 of the conventional engine described above are interchangeable and share the same basic structure.

More specifically, the connecting rod 20 is a highly stiff metal element, e.g., forged of steel. The connecting rod 20 includes a rod 21 which has the form of a bar, a smaller end part 22 provided at one end of the rod 21, and a larger end part 23 which is provided at an other end of the rod 21 and which is larger than the smaller end part 22. A recessed area 21a defined by elongated ribs 21b and 21b at both sides is formed in a center of the front surface and the back surface of the rod 21. The rod 21 has a traversal cross-section which substantially has the shape of an "I."

A narrow pin hole 22a is formed in the smaller end part 22. A wide pin hole 23a which has a larger diameter than the narrow pin hole 22a is formed in the larger end part 23. The larger end part 23 is combined into an integral part by abutting a lower portion 23L against an upper portion 23U and securing the two elements with bolts.

The connecting rod 20 is further provided with damping plates 50 (one example of a damping element) which have a flat shape and are attached to the rod 21 and a top portion of the larger end part 23. The connecting rod 20 of the present embodiment is provided with two damping plates 50, one attached to a front surface and one to a back surface of the connecting rod 20.

More specifically, the damping plate 50 is a metal plate made from, e.g., steel and substantially having the shape of a "Y" or a "T." The damping plate 50 includes an elongated extending portion 51 which extends along the rod 21 and a pair of feet 52 and 52 which protrude to both sides from a lower end of the extending portion 51. The extending portion 51 substantially has the same shape and the same dimensions as the front surface and the back surface of the rod 21 such that the extending portion 51 corresponds to, and overlaps with, the front surface and the back surface of the rod 21. The feet 52 and 52 substantially have the same shape and the same dimensions as a side surface of a front top portion and of a back top portion of the larger end part 23 such that the feet 52 and 52 correspond to, and overlap with, the side surface of the front top portion and of the back top portion of the larger end part 23.

First bolt insertion holes 53 are formed in rims of an upper end and of an intermediate portion of the extending portion 51. Second bolt insertion holes 54 are formed in a projecting end portion of each of the feet 52 and 52. Corresponding to each of the first bolt insertion holes 53, first bolt fastening holes 24 are formed at a plurality of locations of the ribs 21b of the rod 21. Corresponding to each of the second bolt insertion holes 54, second bolt fastening holes 25 are formed at two locations, namely one each in the side surface of the front top portion and in the side surface of the back top portion of the larger end part 23.

The damping plate 50 is arranged so as to cover the top portion of the larger end part 23 and the side surface of the rod 21. The damping plate 50 is mounted by fastening bolts B which have been inserted one each into each of the first and second bolt insertion holes 53 and 54 in the corresponding first and second bolt fastening holes 24 and 25. By doing so, the damping plate 50 is pressed onto the rod 21 and the top portion of the larger end part 23.

Alternatively, the first and second bolt fastening holes 24 and 25 may be through-holes passing through the front surface and the back surface of the rod 21. In this case bolts passing through each of the first and second bolt insertion holes 53 and 54 of the damping plate 50 on one side are passed through each of the first and second bolt fastening holes 24 and 25 and through each of the first and second bolt insertion holes 53 and 54 of the damping plate 50 on the other side. The bolts which protrude from each of the first and second bolt insertion holes 53 and 54 are fastened and fixed with nuts.

Each of fixed portions (first fixed portions) formed by coupling the first bolt insertion holes 53 with the first bolt fastening holes 24 and each of fixed portions (second fixed portions) formed by coupling the second bolt insertion holes 54 and the second bolt fastening holes 25 feature a different mounting strength. The second fixed portions have a higher mounting strength than the first fixed portions. Note that the mounting strength is the strength at which the damping plates 50 are mounted to the connecting rod 20. In the case of the connecting rod 20 of this embodiment, the axial force at which the bolts are fastened corresponds to the mounting strength.

More specifically, at the second fixed portions the mounting strength is so high that the feet 52 and 52 cannot rub against the larger end part 23. By contrast, at the first fixed portions the mounting strength is relatively low such that the extending portion 51 can rub against the rod 21. As a result, a friction generation portion 60 at which friction is generated due to deformation of the rod 21 is provided on a portion of the damping plate 50 near the smaller end part 22. (FIG. 4 and other drawings show a main portion of the friction generation portion 60.)

Consequently, when a large load is acting on the connecting rod 20 such that the rod 21 deforms, frictional heat is generated due to friction of an abutting portion at the portion of the damping plate 50 near the smaller end part 22 which is fixed such that this portion is capable of friction. As a result, energy acting on the rod 21 declines, which is why oscillation of the rod 21 can be reduced.

Friction can be generated by three-dimensional displacement of the abutting portion. Therefore, many different modes of deformation (expansion and contraction, bending, twisting, etc.) can be handled and oscillation over a wide frequency range can be reduced. Simply providing portions of the rod 21 where the rod 21 deforms with the friction generation portion 60 makes provision of a complicated structure unnecessary and hardly increases the weight of the connecting rod. In addition, when the piston is reciprocating during operation of the engine, rotating weight acts on the larger end part 23 of the connecting rod 20, while reciprocating weight acts on the smaller end part 22. Therefore, in comparison to the case where—as disclosed in the known art—a dynamic vibration absorber is installed inside the piston pin near the smaller end part, the structure in which the rod 21 is provided with the damping plate 50 also has the effect that the reciprocating weight can be reduced.

By setting the mounting strength at the smaller end part 22 of the rod 21 low while setting the mounting strength of the larger end part 23 of the rod 21 high, the friction generation portion 60 can be provided near the smaller end part 22 which has a relatively high deformation rate. Therefore, oscillation can be reduced even more effectively as high frictional heat is generated. Since friction of different strengths can be obtained over a wide area of the front surface and the back surface of the rod 21, oscillation over a wider frequency range can be reduced.

Verification Test

In the scope of a test, the connecting rod 20 according to the first embodiment was attached to an engine, and the engine was activated under predetermined conditions (e.g., engine displacement: approximately 2000 cc; engine revolution: 2000 rmp; engine load: Pe900 kPa; tightening torque of first fixed portion: 0.8 N; tightening torque of second fixed portion: 1 N). Oscillation strength was measured separately for each frequency by an acceleration sensor mounted to the rod 21.

Figure 6A:
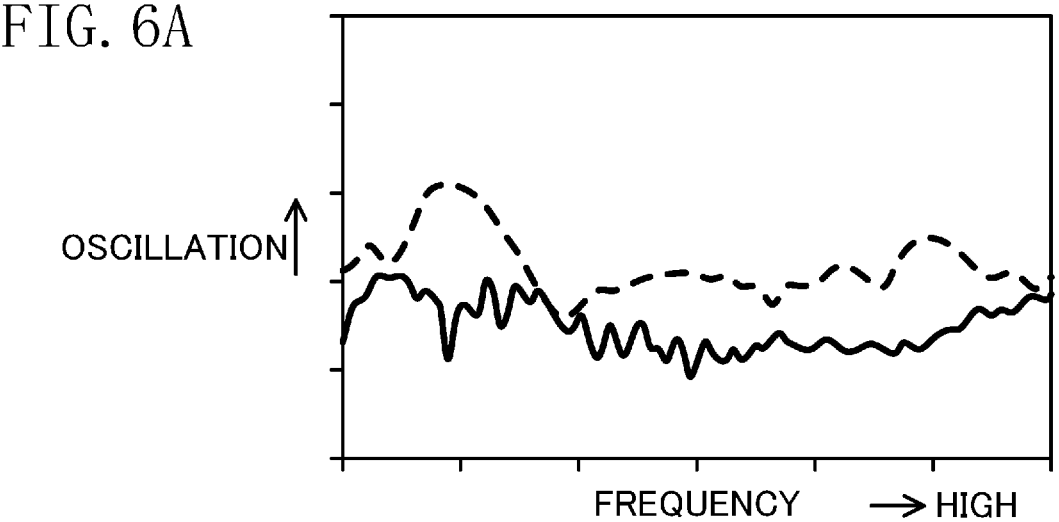
FIG. 6A is a chart showing results of a verification test.
Figure 6B:
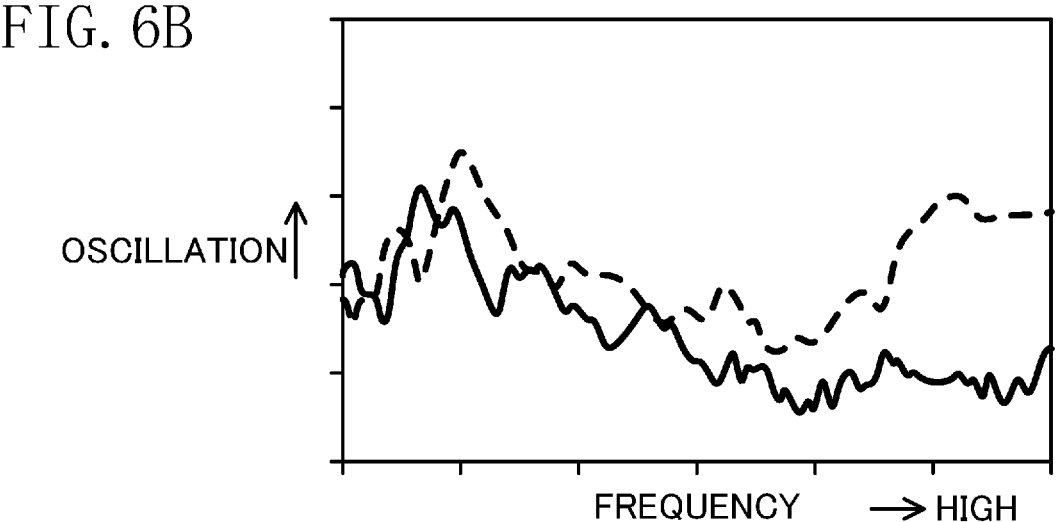
FIG. 6B is a chart showing results of a verification test.
Figure 6C:
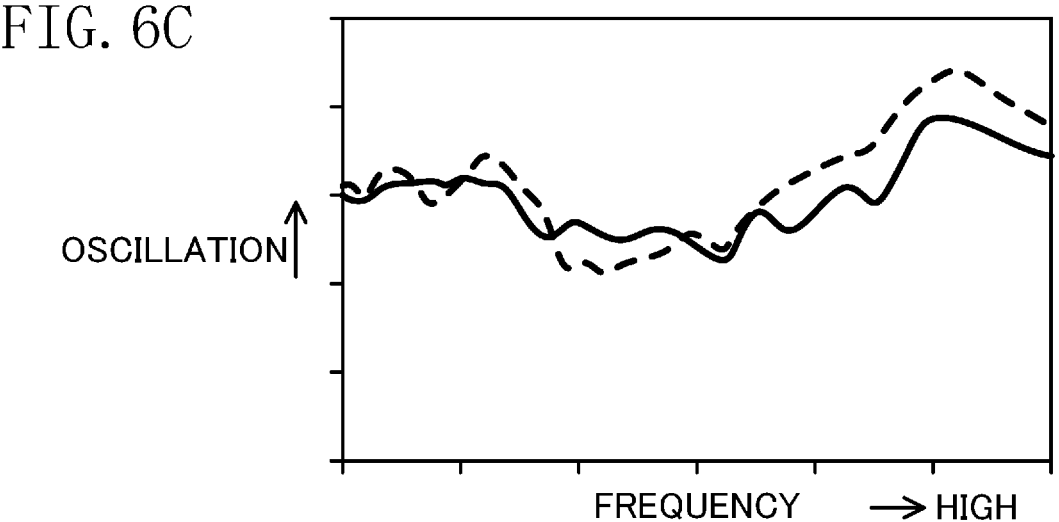
FIG. 6C is a chart showing results of a verification test.

FIGS. 6A to 6C show results of this verification test. FIG. 6A shows measurement results of longitudinal oscillation. FIG. 6B shows measurement results of lateral oscillation. FIG. 6C shows measurement results of vertical oscillation. The dashed lines indicate measurement results regarding a conventional connecting rod which is not provided with any kind of damper (comparative example).

As can be seen from each of these drawings, it has been verified that longitudinal, lateral, and vertical oscillation over a wide frequency range can all be reduced. Consequently, it has become clear that thanks to this vibration control method oscillation over a wide frequency range due to various kinds of deformation of the rod can be reduced.

In accordance with respective specifications various configurations of a connecting rod which materializes this vibration control method are conceivable. For example, in the case of the connecting rod 20 of the first embodiment, the damping plate 50 may be provided only for the rod 21, or attached only to the front surface or only to the back surface. The number and location of the fixed portions, and also the mounting strength can be adjusted. The material for the damping element is not limited to metal and may be, e.g., a ceramic or resin material.

In the following, main variations and other embodiments of such a connecting rod will be described.

First Variation

Figure 7:
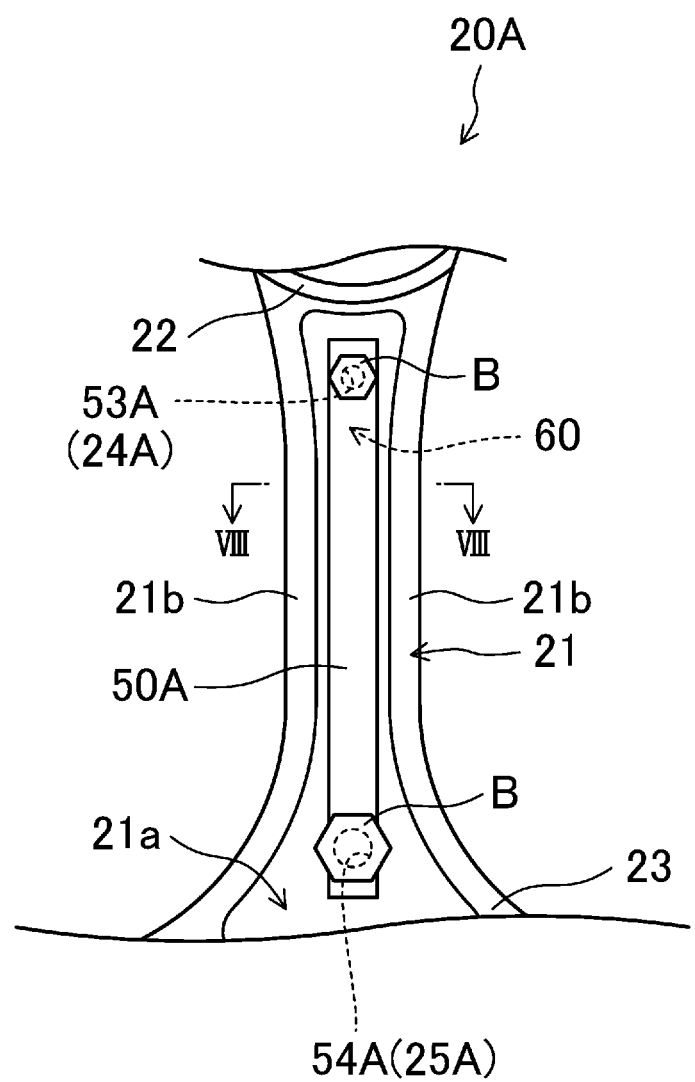
FIG. 7 is a schematic view of a main part of a connecting rod according to a first variation.
Figure 8:
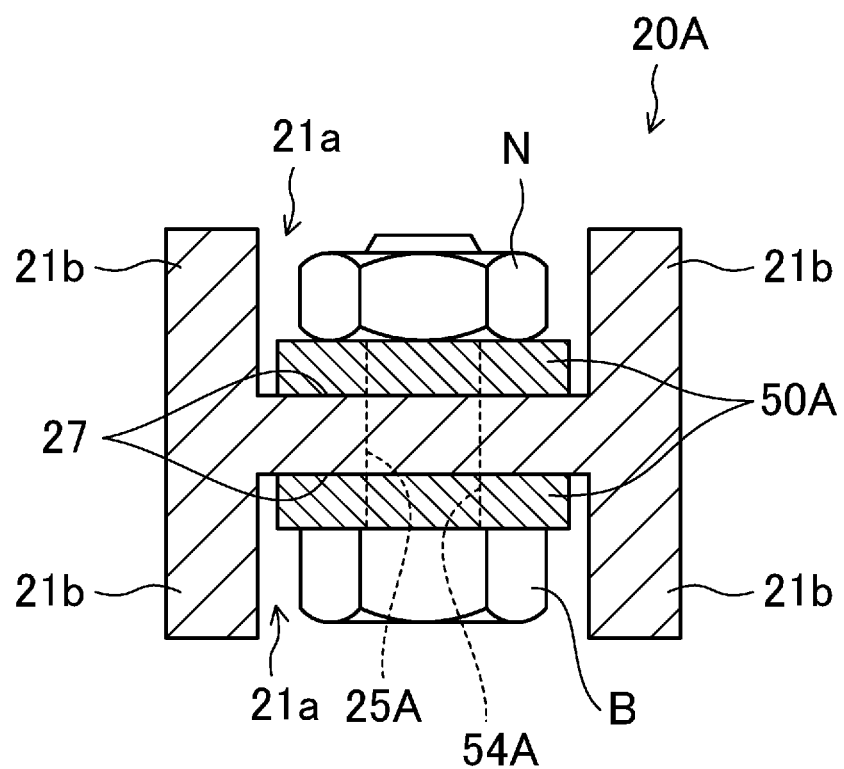
FIG. 8 is a cross-sectional view along the arrowed line VIII-VIII shown in FIG. 7.

FIGS. 7 and 8 show a variation of the connecting rod 20 of the first embodiment (a connecting rod 20A). A damping plate 50A of this variation has the form of a band plate and is attached to the recessed area 21a formed on the front surface and the back surface of the rod 21. The damping plate 50A has a first bolt insertion hole 53A of a small diameter formed in an end portion of the damping plate 50A near the smaller end part 22. The damping plate 50A has a second bolt insertion hole 54A which has a larger diameter than the first bolt insertion hole 53A and is formed in an end portion of the damping plate 50A near the larger end part 23.

The recessed area 21a is provided at its bottom surface with an abutting surface 27 abutting with the damping plate 50A over a wide area. Further, corresponding to the first bolt insertion hole 53A and the second bolt insertion hole 54A, a first bolt fastening hole 24A and a second bolt fastening hole 25A are formed in the bottom surface of the recessed area 21a and longitudinally penetrate the recessed area 21a.

The damping plates 50A which are arranged at both sides of the rod 21 are fixed by fastening nuts N on tips of bolts B which are inserted in, and protrude from, each of the first bolt insertion hole 53A at one side, the first bolt fastening hole 24A, and the first bolt insertion hole 53A at an other side, and the second bolt insertion hole 54A at the one side, the second bolt fastening hole 25A, and the second bolt insertion hole 54A at the other side. For the second bolt insertion holes and the second bolt fastening hole larger bolts B and larger nuts N are used than for the first bolt insertion holes and the first bolt fastening holes. These larger bolts B and larger nuts N are fastened with a higher tightening torque.

By doing so, each of the damping plates 50A is pressed onto the bottom surface of the respective recessed area 21a by surface-to-surface contact over a wide area. The portion of the damping plates 50A near the smaller end part 22 is provided with the friction generation portion 60 capable of friction. In the case of the connecting rod 20A of this variation, further lightweighting can be achieved and oscillation at a wide range of frequencies can be reduced by employing a simple structure. This configuration is further beneficial inasmuch as the damping plates 50A are accommodated in the recessed area 21a thus not posing a hindrance and the bolts B can be fastened in a stable manner.

Second Variation

Figure 9:
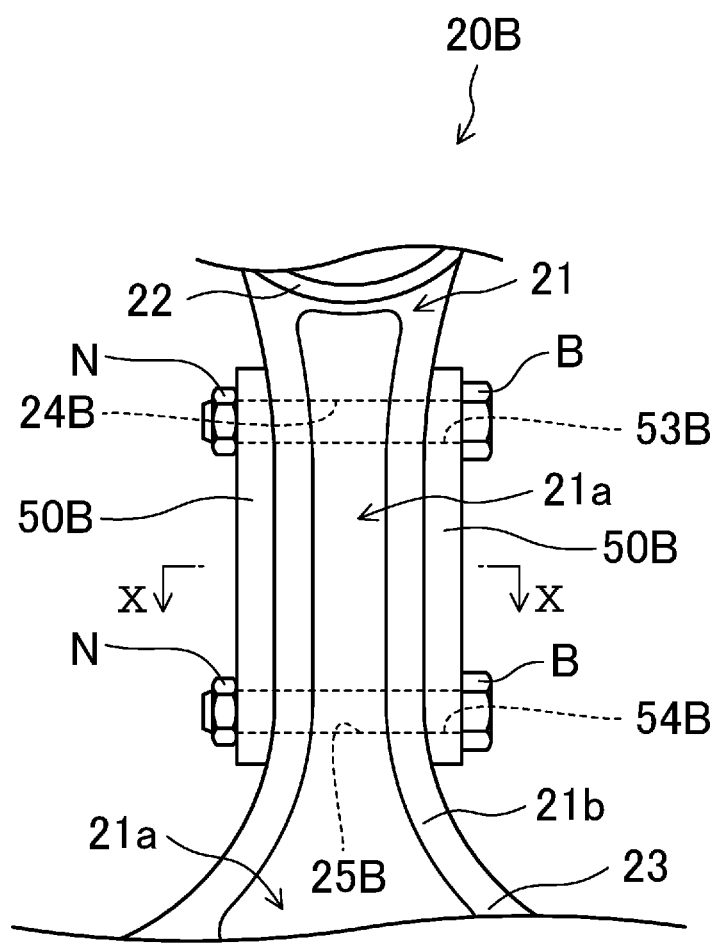
FIG. 9 is a schematic view of a main part of a connecting rod according to a second variation.
Figure 10:
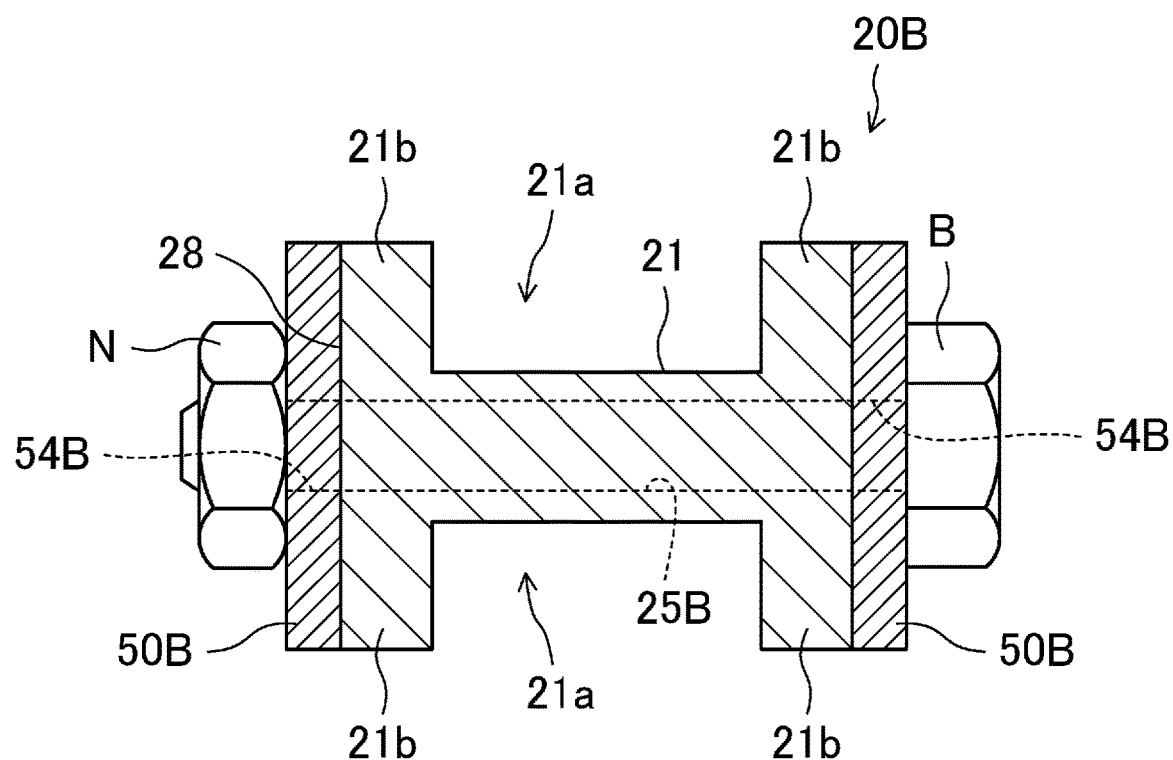
FIG. 10 is a cross-sectional view along the arrowed line X-X shown in FIG. 9.

FIGS. 9 and 10 show another variation of the connecting rod 20 (a connecting rod 20B). In this variation, damping plates 50B are not attached one to the front surface and one to the back surface of the rod 21, but one to a left surface and one to a right surface of the rod 21. The damping plates 50B each have the form of a flat band corresponding to, and overlapping with, the left surface and the right surface of the rod 21 respectively. The damping plates 50B each have a first bolt insertion hole 53B in an end portion arranged near the smaller end part 22, and a second bolt insertion hole 54B in an end portion arranged near the larger end part 23.

An abutting surface 28 abutting with the damping plate 50B over a wide area is provided on the left surface and the right surface of the rod 21. Further, corresponding to the first bolt insertion hole 53B and the second bolt insertion hole 54B, a first bolt fastening hole 24B and a second bolt fastening hole 25B are formed in a width center of the left surface and the right surface of the rod 21 and penetrate the rod 21.

The damping plates 50B which are arranged at the left side and at the right side of the rod 21 are fixed by fastening the nuts N on tips of the bolts B which are inserted in, and protrude from, each of the first bolt insertion hole 53B at one side, the first bolt fastening hole 24B, and the first bolt insertion hole 53B at an other side, and the second bolt insertion hole 54B at the one side, the second bolt fastening hole 25B, and the second bolt insertion hole 54B at the other side. The bolt in the second bolt insertion holes and the second bolt fastening hole is fasted with a higher tightening torque than that in the first bolt insertion holes and the first bolt fastening hole.

As a result, the damping plates 50B are pressed onto the left surface and the right surface of the rod 21 by surface-to-surface contact, and the friction generation portion 60 capable of friction is provided near the smaller end part 22. In the case of the connecting rod 20B of this variation, the damping plates 50B can be designed wider than in the case of the connecting rod 20A of the first variation, which is why the connecting rod 20B can be provided with a large friction generation portion 60. Moreover, another advantage of this configuration is that sufficient space can be obtained around head portions of the bolts B and the nuts N, which results in an excellent workability.

Second Embodiment

Figure 11:
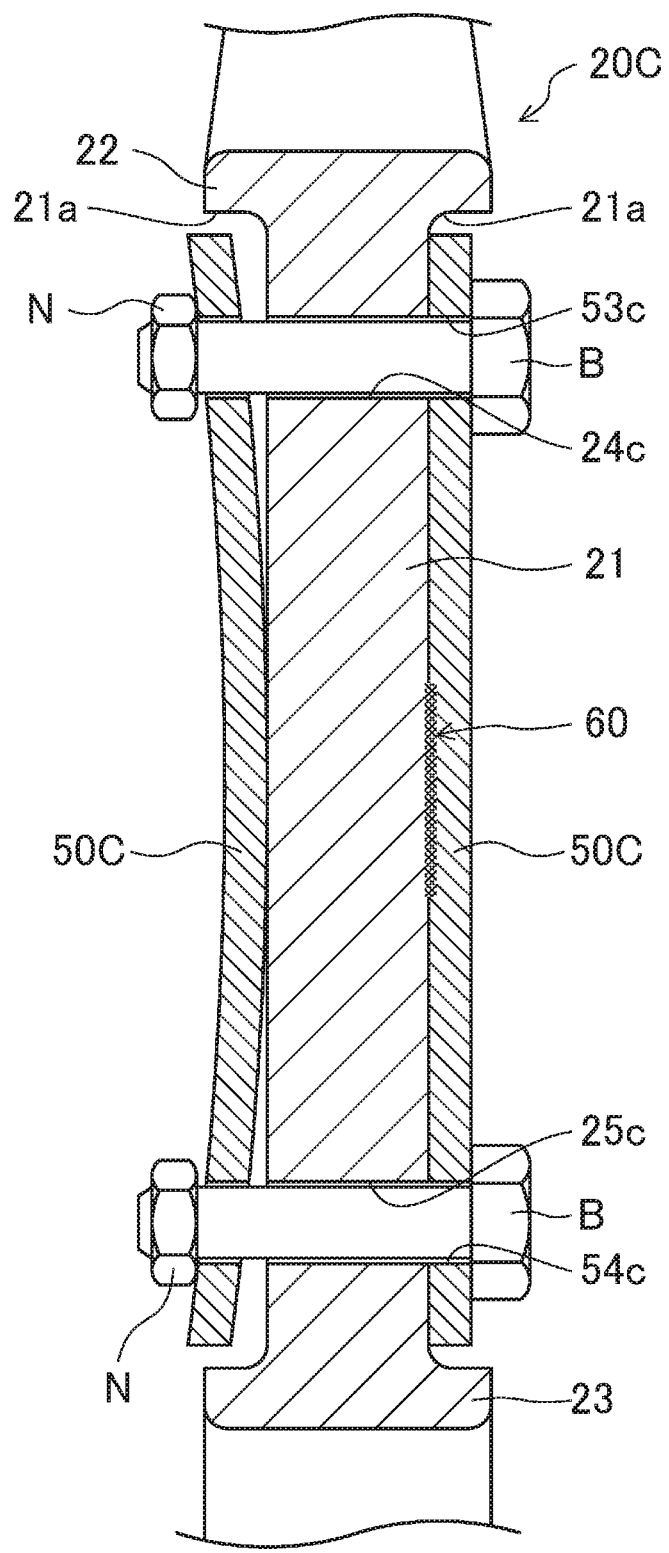
FIG. 11 is a cross-sectional view illustrating a main part of a connecting rod according to a second embodiment of the present disclosure.

FIG. 11 shows a second embodiment of the connecting rod 20 (a connecting rod 20C). In the first embodiment described above, the damping plate is pressed onto the rod 21 and thus axial force of the bolts is used. In the present embodiment, by contrast, elastic force of the damping plate is used.

The damping plate and the connecting rod have the same basic structure as in the first variation. For example, a damping plate 50C has the form of a flat band and is attached to the recessed area 21a formed on the front surface and the back surface of the rod 21. However, the damping plate 50C of the connecting rod 20C is curved in an arc-like manner in a thickness direction of the flat band, and is comprised of, for example, an elastic spring element made from steel.

The damping plate 50C has a first bolt insertion hole 53C in an end portion arranged near the smaller end part 22, and a second bolt insertion hole 54C in an end portion arranged near the larger end part 23. The second bolt insertion hole 54C may have the same or a larger diameter than the first bolt insertion hole 53C.

Further, corresponding to the first bolt insertion hole 53C and the second bolt insertion hole 54C, a first bolt fastening hole 24C and a second bolt fastening hole 25C are formed in the bottom surface of the recessed area 21a and longitudinally penetrate the recessed area 21a. In a state where curved center portions of the damping plates 50C are directed toward the bottom surface of the recessed area 21a, the damping plates 50C which are arranged at both sides of the rod 21 are fixed by fastening the nuts N on tips of bolts B which are inserted in, and protrude from, each of the first bolt insertion hole 53C at one side, the first bolt fastening hole 24C, and the first bolt insertion hole 53C at an other side, and the second bolt insertion hole 54C at the one side, the second bolt fastening hole 25C, and the second bolt insertion hole 54C at the other side. In this configuration, however, in both rows of holes the bolts B are fastened rigidly—that is, incapable of friction—with the same tightening torque.

As a result, intermediate portions of the damping plates 50C are pressed onto the bottom surface of the recessed area 21a while being in surface-to-surface contact over a wide area, and the friction generation portion 60 capable of friction is provided at an intermediate portion of the rod 21. The connecting rod 20C is particularly effective when it comes to dealing with deformation resulting from longitudinal bending by which the intermediate portion of the rod 21 is strongly deformed.

Variation

Figure 12:
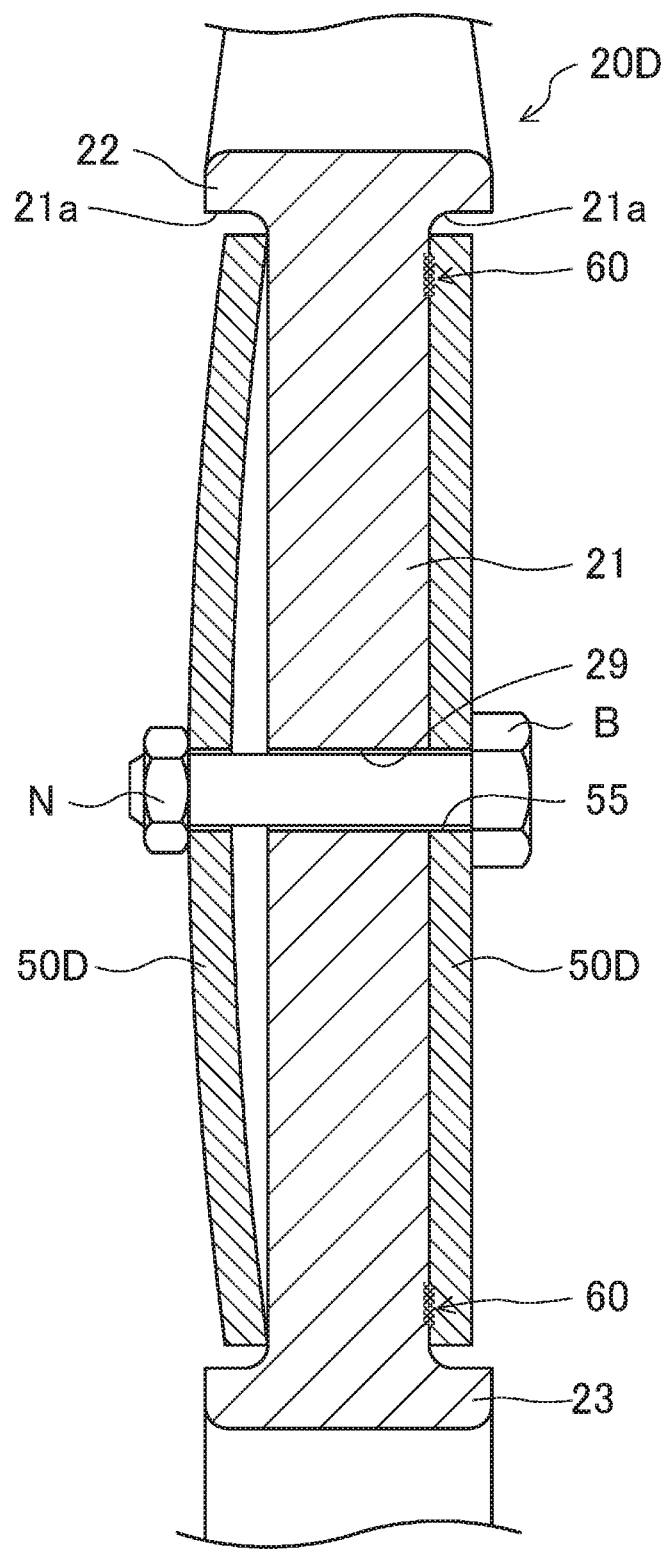
FIG. 12 is a cross-sectional view illustrating a variation of the second embodiment of the present disclosure.

FIG. 12 shows a variation of the second embodiment of the connecting rod 20 (a connecting rod 20D). In this variation, curved damping plates 50D are attached to the rod 21 in a reversed manner. That is, the damping plates 50D are attached to the rod 21 in a state where a dented side of their curved center portion is directed toward the bottom surface of the recessed area 21a.

Specifically, one bolt insertion hole 55 is formed in a longitudinal intermediate portion of each of the damping plates 50D. Further, corresponding to the bolt insertion hole 55, one bolt fastening hole 29 is formed in the bottom surface of the recessed area 21a and longitudinally penetrates the recessed area 21a. In a state where the dented sides of their curved center portions are directed toward the bottom surface of the recessed area 21a, the damping plates 50D which are arranged at both sides of the rod 21 are fixed by fastening a nut N on a tip of a bolt B which is inserted in, and protrudes from, each of the bolt insertion hole 55 at one side, the bolt fastening hole 29, and the bolt insertion hole 55 at an other side.

By doing so, both end portions of the damping plates 50D are pressed onto the bottom surface of the recessed area 21a by line contact or surface-to-surface contact. Portions of the damping plates 50D near both end portions of the rod 21 are provided with the friction generation portions 60 capable of friction.

Third Embodiment

Figure 13:
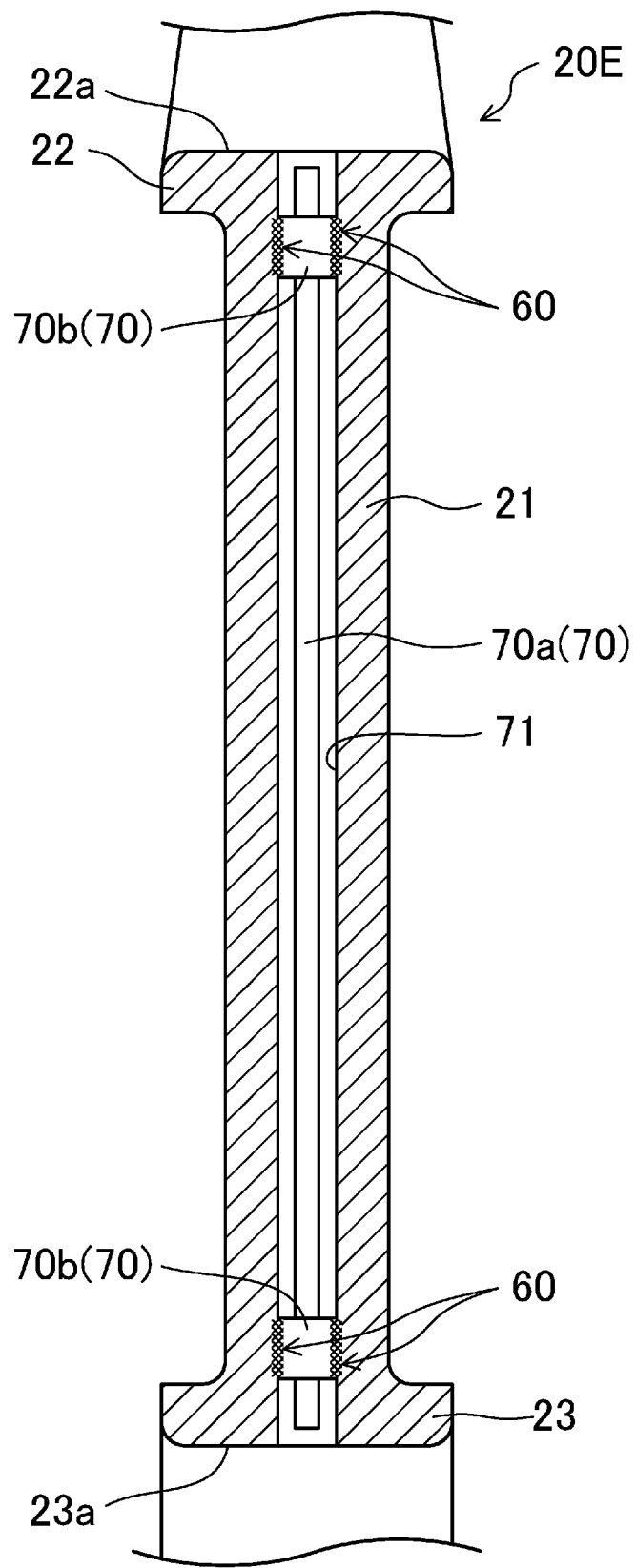
FIG. 13 is a cross-sectional view illustrating a main part of a connecting rod according to a third embodiment of the present disclosure.

FIG. 13 shows a third embodiment of the connecting rod 20 (a connecting rod 20E). In this embodiment, an element having the form of a bar (damping bar 70) is used as damping element. The friction generation portion 60 is generated by press-fitting of the damping element.

Specifically, a slot 71 which extends so as to penetrate a portion between the narrow pin hole 22a and the wide pin hole 23a is formed inside the rod 21. The damping bar 70 includes a metal bar body 70a which can penetrate the slot 71, and press-fitted pieces 70b attached remote from each other at both end portions of the bar body 70a. The press-fitted pieces 70b have an outer diameter which is larger than the inner diameter of the slot 71.

The damping bar 70 is press-fitted into the slot 71 and fixed inside the rod 21. By this, the press-fitted pieces 70b at both end portions of the damping bar 70 are pressed onto an inner peripheral surface of the slot 71. The friction generation portions 60 capable of friction are provided at both end portions of the rod 21.

The connecting rod of each of the embodiments and variations is provided with the friction generation portion 60. Therefore, frictional heat is generated due to the deformation of the rod 21, and the load acting on the connecting rod can be converted into frictional heat and diffused. As a result, oscillation of the rod 21 due to various modes of deformation and resonance generated over a wide frequency band can both be reduced.

What is claimed is:

1. A connecting rod coupling a reciprocating piston to a rotating crankshaft inside an engine, the connecting rod comprising:

a rod having the form of a bar;

a smaller end part provided at one end of the rod and coupled via a piston pin to the piston in a rotatable manner;

a larger end part provided at an other end of the rod and coupled via a crank pin to the crankshaft in a rotatable manner; and a damping element which is at least attached to the rod and extends a full length from the smaller end part to the larger end part, wherein the rod is provided with a friction generation portion at which friction is generated due to deformation of the rod, the friction generation portion is provided by at least partly pressing the damping element and the rod together, the damping element is attached to the connecting rod by a first fixed portion and a second fixed portion which are spaced apart from each other, the first fixed portion and the second fixed portion have different mounting strengths, and at least one of the first fixed portion and the second fixed portion is capable of friction, and the first fixed portion which is capable of friction and has a low mounting strength is arranged near the smaller end part, and the second fixed portion which has a high mounting strength is arranged near the larger end part.

2. The connecting rod of claim 1, wherein the damping element is a flat element extending in a curved manner along the rod, both end portions of the damping element being attached to the rod and an intermediate portion of the damping element being pressed onto the rod.

3. The connecting rod of claim 1, wherein the damping element is a flat element extending in a curved manner along the rod, an intermediate portion of the damping element being attached to the rod and both end portions of the damping element being pressed onto the rod.

4. The connecting rod of claim 1, wherein the damping element is press-fitted into a slot formed inside the rod.

5. A connecting rod coupling a reciprocating piston to a rotating crankshaft inside an engine, the connecting rod comprising:

a rod having the form of a bar;

a smaller end part provided at one end of the rod and coupled via a piston pin to the piston in a rotatable manner;

a larger end part provided at an other end of the rod and coupled via a crank pin to the crankshaft in a rotatable manner; and a damping element which is at least attached to the rod, wherein the rod is provided with a friction generation portion at which friction is generated due to deformation of the rod, the friction generation portion is provided by at least partly pressing the damping element and the rod together, the damping element is attached to the connecting rod by a first fixed portion and a second fixed portion which are spaced apart from each other, the first fixed portion and the second fixed portion have different mounting strengths, and at least one of the first fixed portion and the second fixed portion is capable of friction, and the first fixed portion which is capable of friction and has a low mounting strength is arranged near the smaller end part, and the second fixed portion which has a high mounting strength is arranged near the larger end part.

* * * * *